(No Model.)

H. E. FOSTER.
DETACHABLE HOOK.

No. 287,115. Patented Oct. 23, 1883.

Witnesses:
J. O. Morris.
Jacob Lorum.

Inventor:
Hickman E. Foster
By Peirce & Fisher
Attorneys.

UNITED STATES PATENT OFFICE.

HICKMAN E. FOSTER, OF DECATUR, ILLINOIS, ASSIGNOR OF ONE-HALF TO WILLIAM H. ACUFF AND JAMES M. WISWELL, BOTH OF SAME PLACE.

DETACHABLE HOOK.

SPECIFICATION forming part of Letters Patent No. 287,115, dated October 23, 1883.

Application filed April 9, 1883. (No model.)

*To all whom it may concern:*

Be it known that I, HICKMAN E. FOSTER, a citizen of the United States, residing at Decatur, in the county of Macon and State of Illinois, have invented certain new and useful Improvements in Detachable Hooks, of which the following is a full, clear, and exact description.

The purpose of my invention is to provide an improved detachable hook of such construction that it may be securely held to the object to which it is attached, and yet, when desired, may be readily and instantly disconnected therefrom.

To this end my invention consists, first, in the combination, with the hook, of a pawl or trigger arranged in substantially the manner hereinafter described, whereby by tripping the pawl the hook will be at once detached; and secondly, in providing means whereby the hook may be locked in position and guarded against accidental displacement.

My invention further consists in certain other details of construction, hereinafter described, illustrated in the accompanying drawings, and particularly defined in the claims at the end of this specification.

Figure 1:
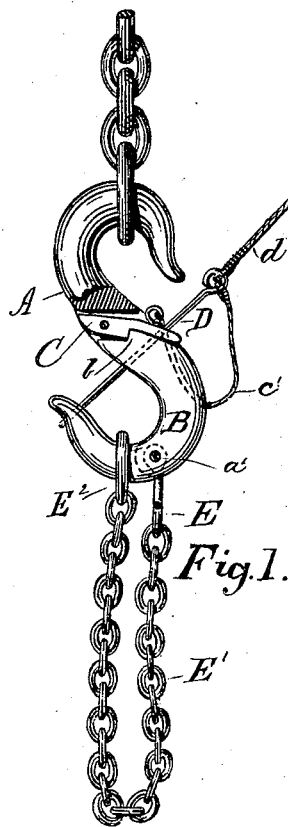
Figure 2:
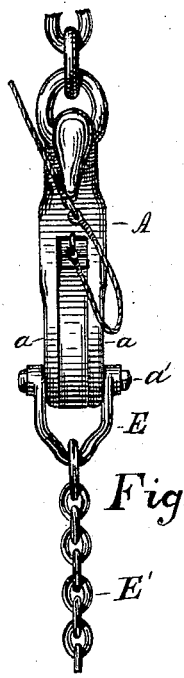
Figure 3:
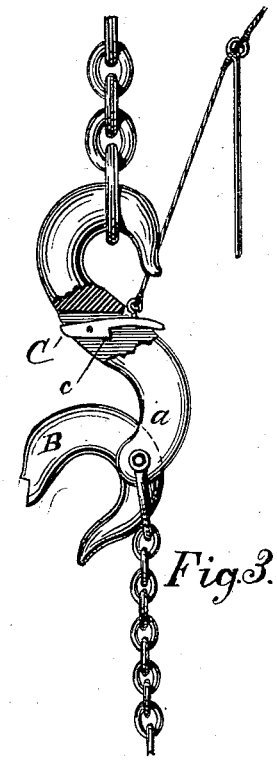
Figure 4:
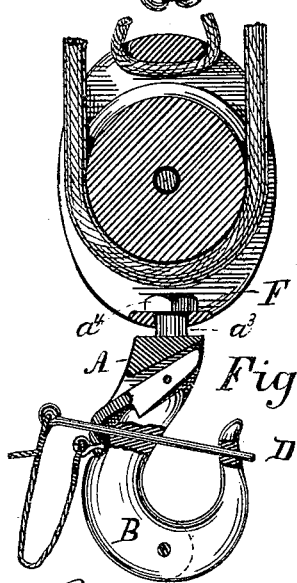
Figure 5:
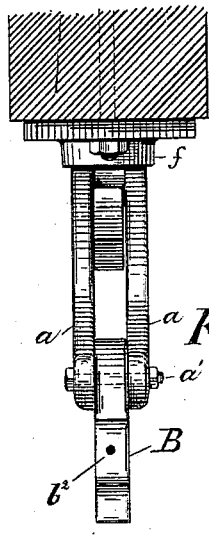
Figure 6:
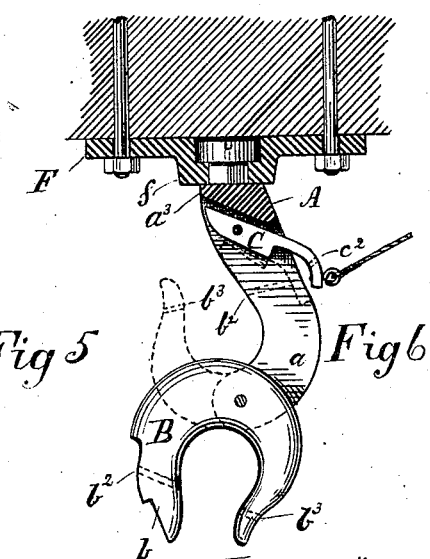

Figures 1, 2, and 3 are views of one form of hook embodying my invention, Fig. 1 showing the same in side elevation, one-half of the shank or body being broken away, for better illustration, Fig. 2 being a view in rear elevation, and Fig. 3 showing the position of the parts after the pawl has been tripped. Fig. 4 is a view, partly in side elevation and partly in section, of a hook embodying my invention and applied to a pulley-block. Fig. 5 is a view in rear elevation; and Fig. 6 is a view, partly in vertical section and partly in side elevation, of my improved hook as applied by a rigid connection to a plate adapted to be bolted to a support.

A designates the shank or body of the hook, through the forks $a$ of which passes the pin $a'$, upon which is pivotally hung the hook-mouth B, in such manner that the pivotal point shall be slightly back of the point of suspension for the weight. The rear end of the hook-mouth B is furnished with the ratchet or notch $b$, into which catches the shoulder $c$ of the pawl C when the hook-mouth is turned, as shown in Figs. 1 and 4, into position for use. The pawl C is pivotally hung between and near the top of the forked arms $a$, and is operated by means of the cord or chain $c'$, which is connected to the lock-pin D, operated by means of the cord $d$. This lock-pin, when in position, passes through the perforations $c^2$ and $b^2$, formed, respectively, in the pawl C and ratchet $b$, and thus effectually locks the hook against any accidental detachment, and it is also preferably passed across the hook-mouth and into the perforation $b^3$, thus securely retaining the object hooked within said mouth.

From the construction thus far defined it will be seen that when the pawl C is in the ratchet $b$, as shown in Figs. 1 and 4, the hook-mouth B is prevented from turning forward and remains attached to the object; but if, now, by pulling the cord $c'$ the pawl C is lifted, the hook turns forward and is at once detached. The lock-pin D prevents accidental tripping of the pawl, and it will be noticed that the cords $c'$ and $d$, by which this pawl is operated, are so connected to the pin that the pin will be first withdrawn before the pawl is tripped.

It will be understood of course that, if desired, the locking-pin in some cases need not extend across the hook-mouth, or may be entirely dispensed with, in which latter case the cord $d$ would be fastened directly to the pawl.

As clearly shown in Fig. 2, the pin $a'$ is extended beyond the sides of the forked arms $a$, and upon the ends of this pin is hung the yoke E, to which is connected the hook-chain E', furnished with the ring $E^2$, adapted to fit over the point of the hook. This hook-chain may be of any suitable length, and its purpose is to enable the hook to be detachably connected to objects to which it would be otherwise difficult or impossible to fasten it.

In Fig. 4 my improved hook is shown as attached by a swivel-joint to its support. The shank or body A is provided with a lug, $a^3$, which passes through a perforation in the support F, and is held therein by means of a riveted nut or other suitable device. The support shown in Fig. 4 is a pulley-block of ordinary construction. In Figs. 5 and 6 F designates a plate or disk, to which the square shank $a^3$ is rigidly bolted by the retaining-nut $a^4$, and which has holes, to permit of its being readily bolted to a plain surface. The form of pawl and ratchet is somewhat varied in the construction of hook shown in Figs. 4, 5, and 6, in order to give double bearing or catch-points for the pawl, thus rendering the same more secure.

It is obvious that the construction above described may be varied without departing from the spirit of the invention, and I do not wish to be understood therefore as limiting myself to the precise details set out.

My improved hook, while capable of useful application in a great number of connections, will be found of especial advantage in boat-lowering and jib-tending apparatus, railway-switching and wrecking apparatus, and, in fact, wherever it is desirable that a hook should be instantly and with certainty detached from its weight and without the necessity of slacking the tackle.

Having thus described my invention, what I claim as new, and desire to secure by Letters Patent, is—

1. The combination, with the hook-body, of the pivoted hook-mouth having a perforated and notched end, a perforated pawl, and a locking-pin adapted to enter the perforations of said pawl and notched end, substantially as described.

2. The combination, with the hook-body, of a pivoted mouth having a perforated and notched end, a perforated pawl, and a locking-pin adapted to pass across said hook-mouth, and also to lock the parts in position, substantially as described.

3. The combination, with the hook-body, of the pivoted hook-mouth having notched ends, the pawl, the locking-pin, and a tripping-cord connected to said locking-pin and to the pawl, substantially as described.

4. The combination, with the hook-body, of the pivoted hook-mouth and hook-chain secured to pin of the hook-body, and means for holding the mouth in position for use, substantially as described.

5. The combination, with the hook-body, of the pivoted hook-mouth, and means for holding the same in position for use, the hook-chain and locking-pin adapted to extend across said mouth and retain the chain therein, substantially as described.

6. The combination, with the hook-body, of the pivoted hook-mouth having notched end, the pawl, the support, and a swivel-joint between the hook-body and the support, whereby the hook may be allowed to turn freely upon its support, substantially as described.

In testimony whereof I have hereunto set my hand this 15th day of March, A. D. 1883.

HICKMAN E. FOSTER.

In presence of—
  JNO. R. WILLIAMS,
  S. F. GREER.